: United States Patent (12) United States Patent
Pieronek et al.

(10) Patent No.: US 9,016,807 B1
(45) Date of Patent: Apr. 28, 2015

(54) ELECTRIC-HYDRAULIC ANTILOCK BRAKING SYSTEM FOR A TRAILER

(75) Inventors: Donald Pieronek, Brookfield, WI (US); Alan Hoogenakker, Urbandale, IA (US)

(73) Assignee: Tuson RV Brakes, LLC, Vernon Hills, IL (US)

( * ) Notice: Subject to any disclaimer, the term of this patent is extended or adjusted under 35 U.S.C. 154(b) by 484 days.

(21) Appl. No.: 13/405,491

(22) Filed: Feb. 27, 2012

(51) Int. Cl.
*B60T 13/74* (2006.01)
*B60T 8/17* (2006.01)
*B60T 8/171* (2006.01)
*B60T 8/32* (2006.01)

(52) U.S. Cl.
CPC ............ *B60T 8/1708* (2013.01); *B60T 2270/10* (2013.01); *B60T 8/171* (2013.01)

(58) Field of Classification Search
CPC ......... B60T 8/17; B60T 8/1708; B60T 8/171; B60T 8/172; B60T 8/17551; B60T 8/176; B60T 11/108; B60T 2270/10
USPC ............. 303/3, 7, 123, 9.62, 15, 138; 701/70, 701/79, 82; 280/423.1, 432
See application file for complete search history.

(56) References Cited

U.S. PATENT DOCUMENTS

| | | | |
|---|---|---|---|
| 5,042,883 A * | 8/1991 | McCann et al. ................... 303/7 |
| 5,941,612 A * | 8/1999 | Carpenter ...................... 303/122 |
| 6,516,925 B1 * | 2/2003 | Napier et al. ............. 188/112 A |
| 2002/0095251 A1 * | 7/2002 | Oh et al. ........................... 701/70 |
| 2002/0107627 A1 * | 8/2002 | Funke et al. ..................... 701/70 |
| 2003/0117011 A1 * | 6/2003 | Ackley .............................. 303/7 |
| 2007/0102996 A1 * | 5/2007 | Kelly et al. ...................... 303/3 |
| 2009/0150118 A1 * | 6/2009 | Naima .......................... 702/165 |
| 2009/0204303 A1 * | 8/2009 | Leschuk et al. ................. 701/71 |
| 2010/0211277 A1 * | 8/2010 | Craig et al. ...................... 701/70 |

* cited by examiner

*Primary Examiner* — Melody Burch
(74) *Attorney, Agent, or Firm* — G. Brian Pingel; David M. Breiner (57) ABSTRACT

An electric-hydraulic antilock braking system (ABS) installed in a trailer is coupled with a tow vehicle to facilitate controlled braking of the trailer. A trailer in-cab controller (TIC) monitors vehicle networks for diagnostic information used in determining appropriate braking actions to be taken. A communication network can interconnect the TIC, a trailer actuator controller (TAC), and an ABS controller. The ABS controller receives current tow vehicle speeds and current trailer wheel speeds, and dynamically adjusts the brakes based on the differences in the speeds. A three-way solenoid valve or an equivalent valve structure thereto allows for the ABS system to be quickly activated and deactivated.

9 Claims, 9 Drawing Sheets

ELECTRIC-HYDRAULIC ANTILOCK BRAKING SYSTEM FOR A TRAILER

CROSS-REFERENCE TO RELATED APPLICATIONS

This application is related to U.S. patent application Ser. No. 12/079,357, filed Mar. 26, 2008, now U.S. Pat. No. 7,741,960, which is incorporated by reference herein in its entirety. This application is also related to U.S. patent application Ser. No. 10/861,498, filed Jun. 7, 2004, which is incorporated by reference herein in its entirety. This application is also related to U.S. provisional patent application Ser. No. 60/476,359, filed Jun. 6, 2003, which is incorporated by reference herein in its entirety.

BACKGROUND

Brake systems for towed vehicles (referred to interchangeably herein as "trailers") typically are electric, pneumatic, or hydraulic, where the level of force applied to the brake drum or rotor is set by the force applied to the brake pad by the actuator. In those conventional systems, release of the brakes, when the tires cease to rotate, is performed by the vehicle operator who releases a brake pedal or a manual control lever. Releasing the brake pedal or manual control lever reduces the force applied to the brake pad by the actuator, thereby allowing the wheels to rotate. In those systems, all of the trailer's wheels generally respond to this single brake force control signal.

Present tow vehicles (e.g., vehicles that tow a trailer) incorporate antilock brake systems (ABSs) to facilitate maintaining control of the tow vehicle by pulsing the braking force applied to the vehicle's wheels when the brake pressure applied by the operator causes the wheels to lock up. This generally is accomplished using electronic wheel speed sensors that monitor the speeds of one or more of the vehicle's wheels and, when a wheel stops rotating, the braking control system releases the pressure to a brake cylinder associated with the wheel, allowing the wheel to rotate again. The ABS quickly reapplies brake pressure and repeats the cycle until the driver releases the brake pedal or the vehicle comes to a stop.

However, the conventional trailer ABS systems still allow for an undesireable amount of skidding and undesireably long stopping times because they typically only release brake pressure in response to detecting that rotation of a wheel has ceased. During the period of time between cessation of the wheel's rotation and the release of the brake pressure, the wheel is not rotating, and thus is skidding. This skidding can lead to tire wear such as, for example, "flat-spotting," increased stopping times, and the like.

SUMMARY

This summary is provided to introduce a selection of concepts in a simplified form that are further described below in the Detailed Description. This summary is not intended to identify key features or essential features of the claimed subject matter, nor is it intended to be used, in isolation, as an aid in determining the scope of the claimed subject matter. At a high level, embodiments of the invention relate to an antilock braking system (ABS) that facilitates controlled braking of a towed vehicle ("trailer") coupled with a tow vehicle. For example, embodiments of the invention relate to a combination of a hydraulic braking system, wheel-speed monitoring technology, communications and electronic control that facilitates independent modulation of the pressures applied to each trailer wheel in the hydraulic braking system.

Embodiments of the invention facilitate maintaining control of a trailer during a braking event. Additionally, by implementing embodiments of the invention, stopping distance of the tow vehicle and trailer can be reduced and the tire wear associated with skidding can be reduced. According to various embodiments of the invention, wheel-speed sensors monitor the rotation of the trailer's wheels and the system attempts to maintain the speed of the trailer's wheels at a speed that is less than that of the tow vehicle. In this manner, braking control can be achieved while minimizing (and, in some cases, eliminating) the amount of time that a trailer tire skids on the road surface, thereby improving stopping distances, reducing tire wear, and improving directional control of the trailer during braking events.

A first illustrative embodiment of the present invention relates to an antilock braking system (ABS) that facilitates controlled braking of a trailer coupled to a tow vehicle. According to aspects of the embodiment, the ABS includes an ABS controller that receives a current wheel speed associated with a trailer wheel and adjusts a brake level associated with the wheel. Aspects of the embodiment also include a trailer in-cab controller (TIC) that determines a current speed of the tow vehicle ("current vehicle speed") and provides the current vehicle speed to the ABS controller. The system also includes an actuator controller (TAC) that controls an electric-hydraulic trailer actuator ("actuator"), which generates a hydraulic pressure supply and provides the hydraulic pressure supply to the ABS controller. According to various implementations of the first illustrative embodiment, a three-way valve that operates to selectively connect the hydraulic pressure supply to the brake cylinder is disposed between the hydraulic pressure supply and the brake cylinder.

A second illustrative embodiment of the present invention relates to a method for facilitating controlled braking of a trailer coupled to a tow vehicle. In aspects of the illustrative embodiment, the trailer includes a trailer antilock brake system (ABS) having an ABS controller that, in a first illustrative step, receives a current wheel speed associated with a trailer wheel. At a second step of the illustrative method, a current speed of the tow vehicle ("current vehicle speed") is determined and provided to the ABS controller. Aspects of the illustrative method further include generating, at an electric-hydraulic trailer actuator ("actuator"), a hydraulic pressure supply and providing the hydraulic pressure supply to the ABS controller. By adjusting a position of a three-way valve, the hydraulic pressure supply can be selectively connected to a brake cylinder associated with the wheel. Additionally, according to aspects of the illustrative embodiment, the brake level associated with a wheel can be adjusted by adjusting a position of a modulating valve that modulates delivery of the hydraulic pressure supply to the brake cylinder.

A third illustrative embodiment of the present invention relates to a braking system for a trailer that is coupled to a tow vehicle. According to aspects of the illustrative embodiment, the braking system includes a trailer antilock brake system (ABS) having an ABS controller that receives a current wheel speed associated with a trailer wheel and adjusts a brake level associated with the wheel. Wheel-speed sensors collect data regarding the rotation of respective associated wheels and provide that data to a trailer in-cab controller (TIC). In embodiments, the TIC determines a current speed of the tow vehicle ("current vehicle speed") and provides the current vehicle speed to the ABS controller. According to an aspect of the illustrative embodiment, the TIC determines the current vehicle speed using an On Board Diagnostic (OBD) connector.

According to various implementations, the system of the third illustrative embodiment can include a trailer actuator module that houses a trailer actuator controller (TAC) and an electric-hydraulic trailer actuator ("actuator"). The TAC controls the actuator and the actuator generates a hydraulic pressure supply, which is provided to the ABS controller. In aspects of the illustrative embodiment, a three-way valve is disposed between a brake cylinder associated with the wheel and the hydraulic pressure supply.

Additional embodiments of the invention include a three-way valve that disconnects the hydraulic pressure supply from the brake cylinder, in response to receiving a communication from the ABS controller. The communication is generated by the ABS controller in response to detection of a particular set of circumstances. For example, in an embodiment, the ABS controller calculates a speed difference between the current trailer wheel speed and the current vehicle speed, selects a brake-release threshold value from a plurality of brake-release threshold values stored in an associated memory, determines that the speed difference exceeds the selected brake-release threshold value, and sends the communication in response to making this determination.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different features, steps or combinations of features or steps similar to the ones described in this document, in conjunction with other technologies. Moreover, although the term "step" is used herein to connote different elements of illustrative methods, the term should not be interpreted as implying any particular order among or between various steps herein disclosed unless and except when the order of individual steps is explicitly described.

Figure 1:
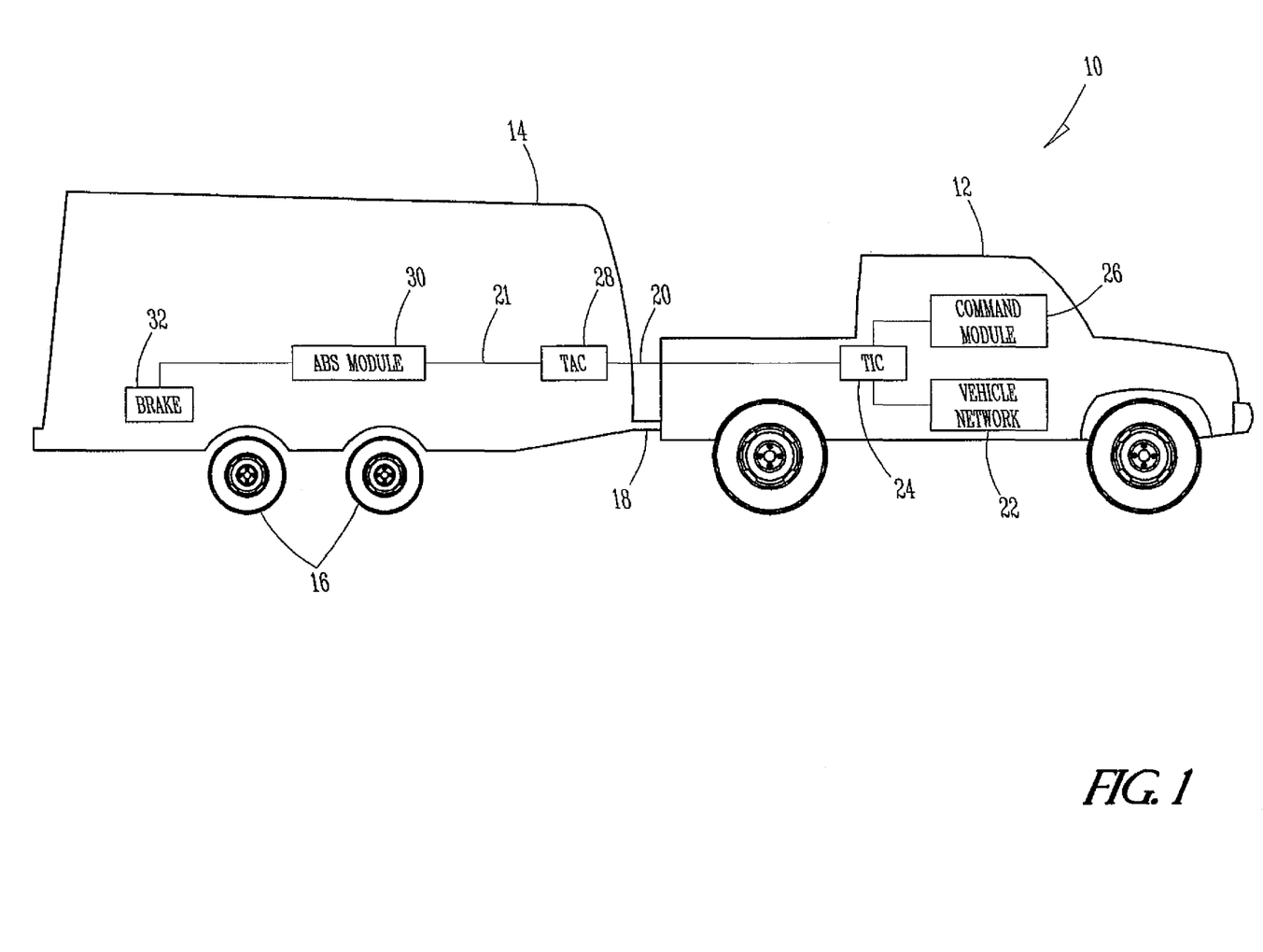
FIG. 1 is a side view depicting an illustrative towing system in accordance with embodiments of the invention.

Referring to the drawings, and particularly to FIG. 1, there is depicted an illustrative towing system 10, in accordance with embodiments of the invention. The towing system 10 includes a towing vehicle (referred to herein as a "tow vehicle") 12 and a towed vehicle 14. Although the towed vehicle 14 can be any type of towable vehicle such as, for example, a trailer, a recreational vehicle (RV), a horse trailer, a portable kiosk, and the like, the term "trailer" will be used throughout this disclosure to refer thereto. It should be understood that, as the term is used herein, a trailer can include any type of vehicle or other apparatus having braked wheels 16 that can be towed by a tow vehicle. Similarly, the tow vehicle 12 can include any type of vehicle capable of towing a trailer such as, for example, a tractor, a pickup truck, a car, and the like. For example, according to one embodiment, the towing system 10 can include a towable RV 14 hitched to a pickup truck 12.

As shown in FIG. 1, the tow vehicle 12 is mechanically coupled to the trailer 14 using a hitch 18. In embodiments, hitch 18 can be any type of suitable mechanism capable of establishing a mechanical connection between the tow vehicle 12 and the trailer 14. Similarly, the tow vehicle 12 is communicatively coupled to the trailer 14 using a communication connection 20. For example, in embodiments the communication connection 20 is a power bus capable of carrying analog or digital communications from one or more components of the system 10 to one or more other components of the system 10. For example, in some embodiments, the communication connection 20 can include the familiar "Blue Wire" connections between the tow vehicle and the trailer. In other embodiments, other types of connections, including wireless connections, can be used as the communication connection 20.

With continued reference to FIG. 1, the tow vehicle 12 includes a vehicle network 22, a trailer in-cab controller (TIC) 24 and a command module 26. In embodiments, the vehicle network 22 can be any type of vehicle network capable of enabling communications suitable for achieving aspects of the functionalities described herein with reference to various embodiments of the invention. Additionally, in embodiments, network 22 can actually include a number of networks such as, for example, a control area network (CAN), a sensing network, any other type of communication network or any number of combinations of these. Exemplary networks include, for example, SAE series J1850 and J1939, FT-CAN, HS-CAN, SW-CAN, MOST, LIN, TTP, FlexRay, IDB-1394, and the like. According to various embodiments of the invention, network 22 can include a binary communication network such as, for example, the modified "Blue Wire" network described in U.S. Pat. No. 7,741,960, filed Mar. 26, 2008, and issued on Jun. 22, 2010 to Hoogenakker and Pieronek, and which is incorporated by reference in its entirety herein. Additionally, in some embodiments, network 22 can include a wireless network enabled by a wireless communication protocol such as, for example, Bluetooth®, ultra-wideband, or the like.

As depicted in FIG. 1, vehicle network 22 is communicatively coupled with the TIC 24 and the command module 26. The TIC 24 communicates with a trailer actuator controller (TAC) 28 by way of the communication connection 20. In various embodiments, the communication connection 20 can be any suitable type of communication connection including, for example, a "Blue Wire" connection, a wireless connection (e.g., Bluetooth®), a binary communication connection, an internet protocol (IP) connection, and the like. It should be understood that the illustrative towing system 10 is merely one example of a suitable towing system and is not intended to express or suggest any particular limitations regarding implementations of aspects of embodiments of the invention. For example, in some embodiments, the tow vehicle 12 and/or the trailer 14 can include any number of additional components. In some embodiments, one or more of the components described herein can be integrated with one another and in other embodiments, one or more of the components described herein can be separated into any number of desired functions and the like. All of these various embodiments and implementation are considered to be within the ambit of the invention.

With continued reference to FIG. 1, the TIC 24 communicates with the vehicle network 22, the command module 26, and the TAC 28. According to various embodiments of the invention, the TIC 24 includes a computing device (referred to herein interchangeably as a "computer"). According to embodiments, the TIC 24 can be any type of computing device capable of processing information and communicating over a network such as, for example, the vehicle network 22, a bus 20, and the like.

Although FIG. 1 illustrates a separate network 21 disposed between the TAC 28 and the ABS controller 30, the data could utilize different network paths to be communicated between the ABS controller 30 and other components such as, for example, the TIC 24, the TAC 28, the vehicle network 22, and the like. For example, the ABS controller 30 could be connected directly to the blue wire network 20 or a vehicle network 22, or via any other intermediate network interface including, for example, wireless networks.

In embodiments of the invention, the TIC 24 (and any one or more of the other components discussed herein) can be implemented as an integrated part of a new system or can be retrofitted to existing systems. In some embodiments, for example, the TIC 24 can plug into an OBDII connector under the dashboard of, for instance, a pickup truck, and automatically determine what vehicle and network types are being operated. The TIC 24 receives data related to the tow vehicle by receiving information from any number of various sources such as, for example, the vehicle network 22, the command module 26, sensors, and the like. By aggregating and, in some embodiments, interpreting data, the operator and the braking system can better understand the conditions surrounding a braking event.

According to various embodiments of the invention, an operator can interact with the TIC 24 via the command module 26. In some embodiments, the command module 26 simply presents information received from the TIC 24. In other embodiments, the command module 26 can operate as an input/output (I/O) device, allowing an operator to fine tune braking levels and other parameters and variables related to the braking system. Additionally, in embodiments, the TIC 24 automatically causes the command module 26 to display an alert to warn the operator of any system faults or failures.

Moreover, in some embodiments, upon being communicatively connected to the TAC 28, the TIC 24 automatically creates a digital, two-way data network over the existing wires of the tow vehicle 12 and trailer 14. According to various embodiments of the invention, the data network sends braking data in a digital format to the TAC 28 and verifies the sent information with each rapid exchange of data. In some embodiments, the TIC 24 also monitors electrical connection and sensor data integrity to ensure the operator has access to a substantially complete picture of the status of the towable brake system.

With continued reference to FIG. 1, in operation, the TIC 24 acquires the vehicle speed via the available vehicle network 22. According to various embodiments of the invention, the vehicle speed and the desired level of brake force can be determined by the TIC 24. The desired braking level to be applied is conveyed to the TAC 22. In embodiments, the TIC 24 can communicate the braking level to the TAC 22 via a network (e.g., a CAN), as described herein. For example, in an embodiment, the communication can be achieved via the traditional industry standard blue wire where the existing blue wire pulse width modulated (PWM) signal is disabled and replaced with a communications network signal such as, for example, the signal described in U.S. Pat. No. 7,741,960.

As FIG. 1 further illustrates, the command module 26 is communicatively coupled to the TIC 24. According to various embodiments of the invention, the command module 26 is an input/output (I/O) component that facilitates operator interaction with the braking system. In embodiments, for example, the command module 26 allows an operator to enter desired settings, read diagnostic data, manually control the ABS brakes, or the like. According to various embodiments, diagnostic data from both the tow vehicle and the trailer can be viewed, for example, on a large color display in real-time.

With continued reference to FIG. 1, the TAC 28 controls an electric-hydraulic actuator that provides a brake pressure supply to the ABS controller 30. According to various embodiments, the TAC 28 is controlled by a network computer that is linked to internal and external sensors which monitor key parameters, variables, conditions, and the like. In embodiments, the TAC 28 can be integrated with the actuator in an actuator module such as, for example, the ActuLink module available from Tuson RV Brakes of Vernon Hills, Ill. The ActuLink module, for example, includes an all-aluminum modular design, which separates the brake fluid reservoir from the electric motor and regulating valve. In embodiments of the invention, the electronic control module is isolated in its own sealed compartment and has a weather tight wire harness connector. The actuator generates a fluid pressure supply and provides the supply to the ABS controller 30. In embodiments, for example, the actuator generates 1,000 psi for use with drum brakes, or 1,600 psi for use with disc brakes and/or the ABS controller 30.

According to various embodiments, the TAC 28 can perform any number of different functions. For example, in some embodiments, the TAC 28 can, in addition to controlling an associated actuator, monitor variables such as, for example, brake fluid level, actuator system temperature, actuator low current condition, actuator over current condition, trailer battery volt level under load, trailer battery amp level under load, and the like. Additionally, according to various embodiments of the invention, the TAC 28 is connected to the command module 26 so that the parameters can be checked from the operator's seat. In some embodiments, the TAC 28 can also automatically cause warnings to be displayed to the operator when problems arise. For example, when electrical connections go bad or the brake fluid leaks through a broken fitting, the TAC 28, in some embodiments, sends an immediate alert to the display of the command module 26.

As is further depicted in FIG. 1, the TAC 28 communicates with an ABS controller 30 that facilitates controlling a brake 32. The brake 32 includes a braking mechanism and a wheel speed sensor (not illustrated in FIG. 1 for the purposes of clarity and brevity). The braking mechanism of the brake 32 can include any number of different types of mechanisms including, for example, drum brakes, disc brakes, and the like. For instance, in an embodiment, the brake 32 includes a disc brake available from Kodiak Trailer Components of Fort Worth, Tex.

According to embodiments of the invention, the ABS controller 30 monitors a number of ABS wheel-speed sensors associated with wheels 16 and independently adjusts a braking level at each brake 32. During aggressive braking, the ABS controller 30 holds the maximum level of braking without locking the tires 16, which results in reduced stopping distances and greater braking stability. In embodiments, the ABS controller 30 is connected to wheel-speed sensors, the TAC 28 and the TIC 24 and the ABS controller 30 captures data from each of these sources and uses it to precisely brake each tire 16 independently. According to various embodiments of the invention, the ABS controller 30 can allow for implementation on triple-axle trailers by linking the hydraulic channel of the center axle brake to the brake, either in front of it, or behind it, depending on the type of suspension.

According to various embodiments, the TIC 24, TAC 28, command module 26, and ABS controller 30 can include computing devices (also referred to, interchangeably, as "computers"). A computing device can include any type of device having a processor, or processing unit, capable of processing data and instructions. Accordingly, aspects of the invention may be described in the general context of computer code or machine-useable instructions, including computer-executable instructions such as program components, capable of being executed by a processor. Generally, program components include routines, programs, objects, components, data structures, and the like. In embodiments, program components can refer to code that performs particular tasks or implements particular abstract data types. Embodiments of the present invention can be practiced in a variety of system configurations, including handheld devices, vehicle-mounted devices, general-purpose computers, specialty computing devices, electronic control units (ECUs), and the like. Embodiments of the invention may also be practiced in distributed computing environments where tasks are performed by remote-processing devices that are linked through a communications network.

In embodiments, data structures and/or computer-executable instructions are stored in computer-readable memory associated with the computing device. Computer-readable media can include, for example, Random Access Memory (RAM); Read Only Memory (ROM); Electronically-Erasable Programmable Read Only Memory (EE-PROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by a processor.

Figure 2:
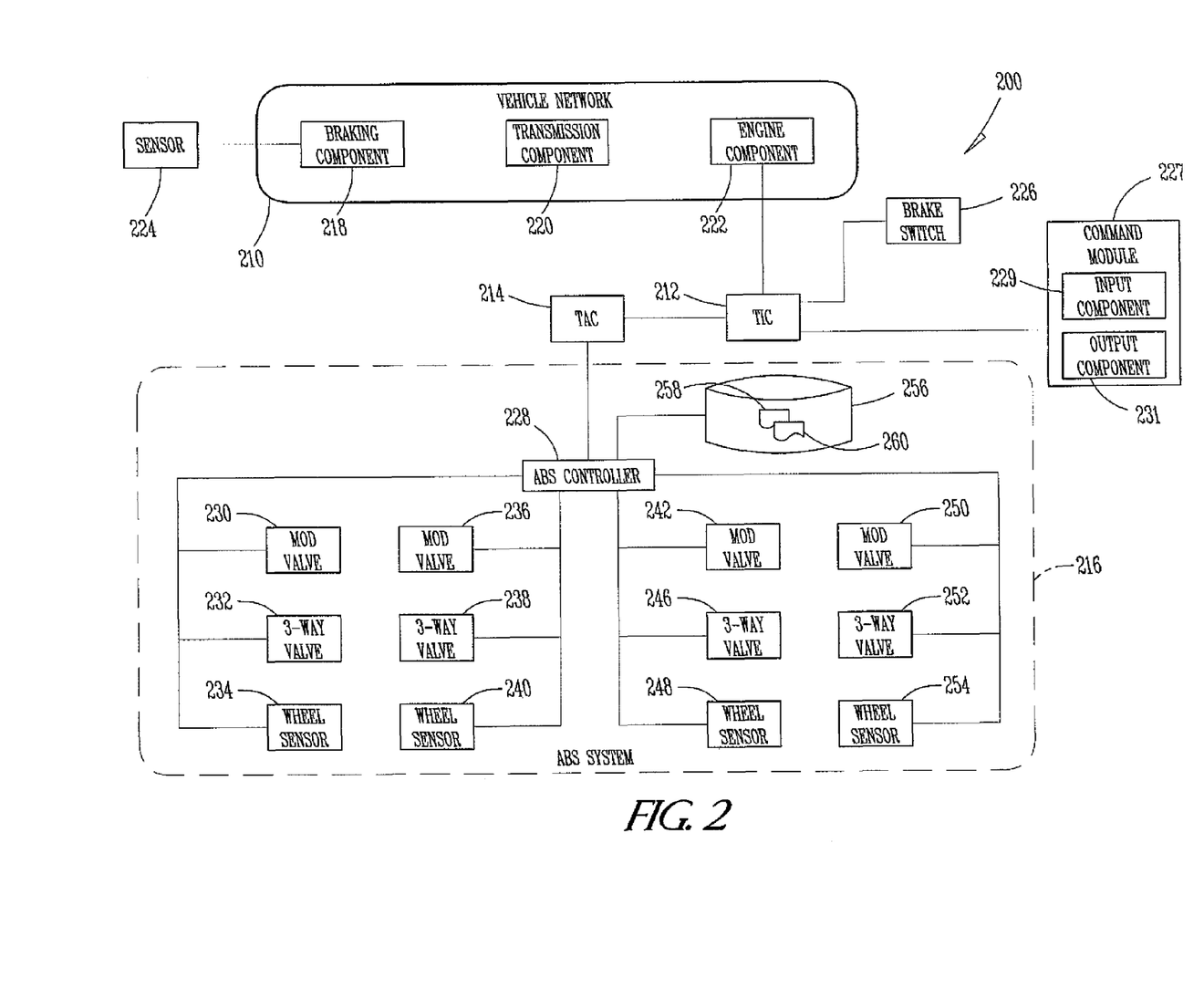
FIG. 2 depicts an exemplary network environment in accordance with embodiments of the invention.

Turning now to FIG. 2, an exemplary network environment 200 suitable for use in implementing various embodiments of the invention is illustrated. It should be appreciated by individuals having skill in the relevant arts that the exemplary network environment 200 shown in FIG. 2 is an example of one suitable network environment and is not intended to suggest any limitation as to the scope of use or functionality of the present invention, Neither should the exemplary network environment 200 be interpreted as suggesting any dependency or requirement related to any single component, or combination of components, illustrated therein and/or described in associated text herein.

As shown in FIG. 2, exemplary network environment 200 includes a vehicle network 210, a TIC 212, a TAC 214, and an ABS 216. The network 210, the TIC 212, and the TAC 214 can be substantially similar to the network 22, the TIC 24, and the TAC 28 described above with reference to FIG. 1. In embodiments, the TIC 212 receives information from the vehicle network 210. For example, the TIC 212 receives a current tow vehicle speed from the vehicle network 210 and receives a current trailer wheel speed from the TAC 214 or the ABS controller 228. Using the two speeds, the TIC 212 can determine an appropriate braking level to be applied to a wheel and can send a communication to the TAC 214 (or, in some cases, directly to the ABS controller 228) to cause the ABS controller 228 to apply a particular braking level to a wheel. In some embodiments, the ABS controller 228 is connected directly to the vehicle network 210 and can receive information (e.g., current vehicle speed, etc.) from the vehicle network 210.

As discussed above with reference to the vehicle network 22 in FIG. 1, the vehicle network 210 can include any number of different types of networks suitable for affecting the communications discussed herein. As is illustrated in FIG. 2, the network 210 includes a braking component 218, a transmission component 220, and an engine component 222. According to various embodiments of the invention, the network 210 can include any number of additional components, as well. In some embodiments, one or more of the components 218, 220, and 222 can be integrated with one another or with another component. In embodiments, diagnostic information (e.g., values corresponding to variables associated with conditions such as, for example, driving conditions, weather conditions, braking conditions, etc.) can be obtained from the braking component 218, transmission component 220, and engine component 222.

In operation, the TIC 212, according to some embodiments, receives diagnostic information from the vehicle network 210. In embodiments, for example, the diagnostic information can include current vehicle speeds, current weather conditions, current road conditions, operator settings and preferences, transmission data, and the like. As shown in FIG. 2, the TIC 212 also is communicatively coupled to a brake switch 226. Using its connection to the brake switch 226, the TIC 212 the position of the brake pedal as it is being pressed or released by an operator.

With continued reference to FIG. 2, a sensor 224 can be communicatively coupled with the vehicle network 210. In embodiments, the sensor 224 can be any type of component capable of obtaining information about something such as, for example, a current condition. Current conditions can include, for example, driving conditions related to the road, weather, tow vehicle, trailer, traffic, or the like. Accordingly, a condition can be characterized using a value assigned to a variable that is established to correspond to the condition. For example, an illustrative road condition might be characterized using a value that indicates a state of a road-surface coverage variable related to weather. That is, for example, one value for such a variable could indicate whether the current road surface is dry, wet, icy, or the like. Other variables can include, for example, various diagnostics related to the trailer connection, the tow vehicle battery voltage, an OBDII network connection integrity measure, a brake controller ground connection, a brake controller power connection, a brake switch voltage, a blue wire voltage output, a blue wire current output, a blue wire short, a ground connection to the trailer, a tow vehicle-trailer data network integrity measure, a trailer battery volt level under load, a trailer battery amp level under load, and the like. In embodiments, variables can include information related to, for example, an actuator brake fluid level, an actuator temperature level, an actuator over-current condition, an actuator low voltage condition, an actuator-ABS controller connection integrity measure, a trailer wheel-speed sensor integrity measure, a trailer ABS valve integrity measure, a trailer tire inflation level, engine revolutions-per-minute (RPMs), transmission temperature, and the like.

Information received from the sensor 224 regarding any number of the above illustrative examples, as well as any number of additional or alternative types of information about variable conditions, can be presented to the tow vehicle operator via the command module 227. In some embodiments, the command module 227 can receive information directly from the sensor 224, while in other embodiments, the command module 227 can receive information from the sensor 224 by way of the vehicle network 210. In further embodiments, the command module 227 communicates directly with the TIC 212 and receives information about conditions via the TIC 212.

According to various embodiments, and with continued reference to FIG. 2, the command module 227 includes an input component 229 and an output component 231. In some embodiments, the command module 227 might include only an input component 229 or an output component 231. Additionally, in various embodiments, the command module can include any number of additional components, combinations of components, or the like. According to various embodiments of the invention, for example, the input component 229 can include any type of input component that by which an operator can provide input to some component of the network environment 200 such as, for example, the TIC 212. That is, the input component 229 can include such illustrative technologies as touch-screen devices, keyboards, buttons, track-balls, track-pads, dials, microphones, and the like.

In embodiments, the output component 231 can include any type of component capable of providing some type of informational output that can be presented to an operator or another component, system, machine, or the like. According to various embodiments, the output component 231 is configured to present a user-interface (UI) display. The output component 231 can be configured as any display device that is capable of presenting information to an operator such as, for example, a monitor, electronic display panel, touch-screen, liquid crystal display (LCD), organic light-emitting diode (OLED) display, plasma screen, or any other suitable display type, and, in some embodiments, may be a reflective surface upon which the visual information is projected. According to embodiments, the input component 229 and output component 231 can be implemented in a single device such as, for example, the DirecLink NE command module available from Tuson RV Brakes, LLC of Vernon Hills, Ill. In other embodiments, the input component 229 and output component 231 can be implemented on separate devices.

As is further illustrated in FIG. 2, the ABS 216 includes an ABS controller 228 that communicates with a number of modulating valves ("mod valve") 230, 236, 242, and 250, a number of three-way valves ("3-way valve") 232, 238, 246, and 252, and a number of wheel sensors 234, 240, 248, and 254. The embodiment illustrated in FIG. 2 is suitable for implementation in trailers having four braked wheels. Thus, for example, the modulating valve 230, the three-way valve 232, and the wheel-speed sensor 234 are all associated with a first trailer wheel; the modulating valve 236, the three-way valve 238, and the wheel-speed sensor 240 are all associated with a second trailer wheel; the modulating valve 242, the three-way valve 246, and the wheel-speed sensor 248 are all associated with a third trailer wheel; and the modulating valve 250, the three-way valve 252, and the wheel-speed sensor 254 are all associated with a fourth trailer wheel. In some embodiments, the trailer might include fewer than four braked wheels (e.g., 1, 2, or 3) and in other embodiments, the trailer might include more than four braked wheels (e.g., 6 or 8).

With continued reference to FIG. 2, the ABS 216 includes a memory 256. In embodiments, for example, the memory 256 can include computer-storage media in the form of volatile and/or nonvolatile memory. The memory 256 can be removable, nonremovable, or a combination thereof. Exemplary hardware devices include solid-state memory, hard drives, optical-disc drives, etc. ABS controller 228 includes one or more processors that read data from various entities such as memory 256. According to various embodiments of the invention, the memory 256 is stored within the ABS controller 228. In other embodiments, the memory 256 is stored in an entity other than the ABS controller 228, and the ABS controller 228 can reference the memory 256 via a communication network.

As illustrated in FIG. 2, the memory 256 can include a proportional-gain table 258 and a brake-release threshold table 260. According to embodiments, the memory 256 can include a number of proportional-gain tables and a number of brake-release threshold tables 260. In some embodiments, for example, the ABS controller can use a brake aggressiveness value (and any number of other values corresponding to variable conditions) to select an appropriate proportional-gain table 258 and to select an appropriate brake-release threshold table 260. According to various embodiments of the invention, the tables 258 and 260 can be any type of suitable data structure such as, for example, tables, matrices, graphs, databases, and the like. The ABS controller 228 references the proportional-gain table 258 to determine a target proportional-gain value and references the brake-release threshold table 260 to determine a target brake-release threshold.

Figure 3A:
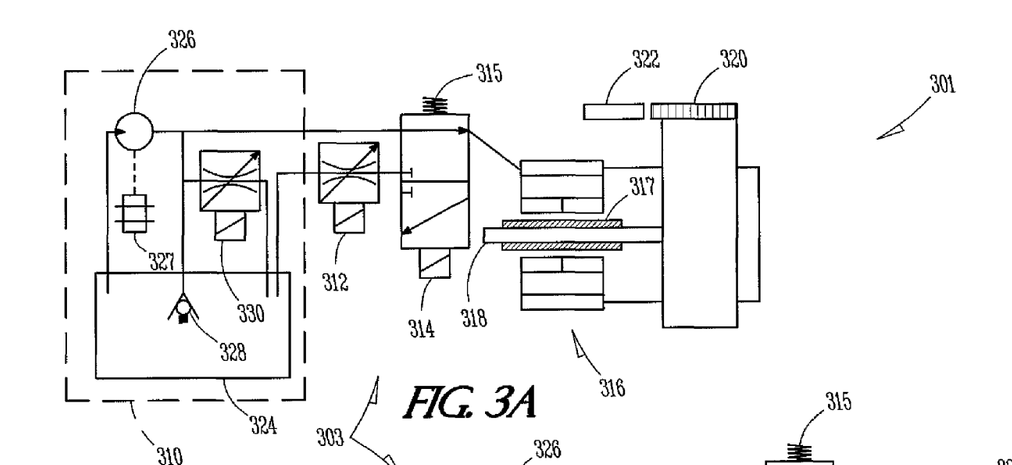
FIGS. 3A and 3B are schematic diagrams that depict two states, respectively, of an illustrative hydraulic ABS in accordance with embodiments of the invention.
Figure 3B:
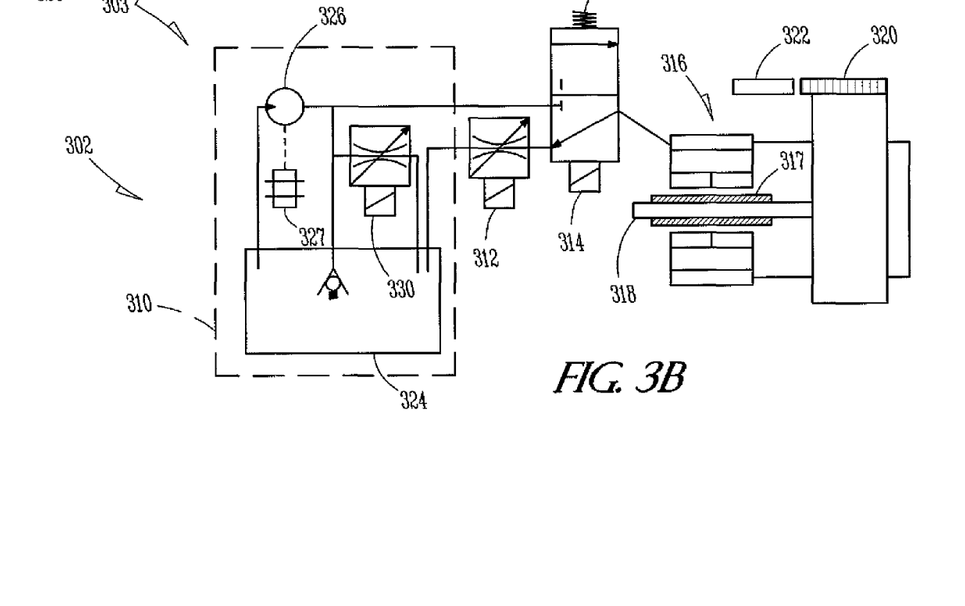

Turning now to FIGS. 3A and 3B, schematic diagrams depict two states 301 and 302 of an illustrative hydraulic ABS 303 in accordance with embodiments of the invention. As illustrated, the illustrative hydraulic ABS 303 includes a trailer actuator controller (TAC) 310 that provides a supply 311 of hydraulic pressure to a brake cylinder 316. A three-way solenoid valve 314 is disposed between the TAC 310 and the brake cylinder 316 and is used to turn on and off the ABS functionality, as is described in more detail below. FIG. 3A depicts the system 303 when the ABS functionality is turned off (e.g., there is not an ABS-braking event occurring) and FIG. 3B depicts the system 303 when the ABS functionality is turned on (e.g., an ABS-braking event is occurring). As illustrated, the ABS 303 also includes a modulating valve 312 that is used to modulate brake pressure during an ABS-braking event. It should be understood by those skilled in the art that the three-way valve 314 can be replaced with two two-way valves and the valve 312 can be replaced by a fixed orifice. FIGS. 3A and 3B are provided to indicate the fluid paths that are required and it should be appreciated that those skilled in the art can create equivalent valving and valve body approaches to achieve the same hydraulic flow paths which should all be considered as falling within the scope of this invention.

With continued reference to FIGS. 3A and 3B, the TAC 310 includes a hydraulic pump 326 driven by an electric motor 326, which is turned on when the TAC 310 receives a communication indicating that a brake level other than zero is to be applied to the brakes. The hydraulic brake pressure 311 applied to the ABS System is determined by a number of factors such as, for example, the position of a regulating valve 330 disposed within the TAC 310. The position of the regulating valve 330 is determined by the brake level value received over the communications network from the TIC (not illustrated for purposes of clarity and brevity). The regulating valve 330, which, in embodiments, is a normally-opened modulating valve, has a pulse width modulated (PWM) signal applied to its coil. According to various embodiments of the invention, applying an increasing duty cycle signal increases the closure force of the regulating valve 330 as the brake level value increases, and as the duty cycle signal is reduced, the brake level value decreases.

To limit the maximum pump pressure 311 and prevent damage to the TAC 310, the TAC 310 includes a pressure relief valve 328. The pressure relief valve 328 opens if the hydraulic pressure 311 exceeds the relief pressure setting of the relief valve 328. Although only a single brake rotor 318 and its associated three-way valve 314 and modulating valve 312 are shown, the hydraulic brake pressure 311 is applied to all of the available brake cylinders 316 of the respective trailer. According to various embodiments, the operation of the TAC 310 is independent of the number of connected brake cylinders 316. In some embodiments, the operation of the TAC 310 is also independent of whether an ABS system is installed in the trailer, or whether the hydraulic brake pressure 311 is applied directly to all the brake cylinders 316 without the modulation functions of an ABS system. That is, various embodiments of the invention will operate with any hydraulic brake pressure source from any hydraulic brake actuator vendor, assuming the required network information is made available to the TAC 310.

With continued reference to FIGS. 3A and 3B, During a braking event, the vehicle speed acquired from the network is compared to the wheel speed determined by the pulse durations monitored by the wheel-speed sensors. If the difference between the vehicle speed and the wheel speed does not exceed the current release threshold value, the three-way valve 314 is in its off position, as shown in FIG. 3A, in which the TAC 310 output pressure 311 is fed through the three-way valve 314 and to the brake cylinder 316, thus pushing inward and causing brake pads 317 to apply pressure to the wheel rotor 318. No antilock brake actions are taken as long as the difference in vehicle speed to wheel speed remains below a threshold. In embodiments, the system can automatically select the threshold and in other embodiments, the threshold can be set by the operator.

As shown in FIG. 3B, if the difference between the vehicle speed and the wheel speed exceeds a selected brake-release threshold value, the three-way valve 314 activated (e.g., the three-way valve shifts upwards, compressing the spring 315 of the three-way valve 314), as depicted in the second state 302, illustrated in FIG. 3B. In FIG. 3B, TAC 310 output pressure 311 is blocked and the brake fluid from the brake cylinder 316 is connected to the modulating valve 312. According to embodiments of the invention, if the modulating valve 312 is open, the fluid will flow through the modulating valve 312 to the hydraulic reservoir 324, thus removing pressure from the brake cylinder 16, thereby allowing the wheel to rotate. When the brake pressure is released from the brake cylinder 316, the wheel speed will accelerate and, once the wheel speed is faster than an up-to-speed velocity threshold value, the three-way valve 314 will deactivate (e.g., return to the position shown in FIG. 3A), where the pump pressure 311 is reapplied to the brake cylinder 316 and the wheel will either continue to rotate faster than the brake-release threshold, or will again slow to the release threshold. It will be understood by those having skill in the relevant arts that the sequences described above can be repeated as often as necessary or desirable to facilitate a controlled braking of a trailer.

Embodiments of the ABS-release scenario described above will prevent skidding the tires at a fixed position, which otherwise tends to result in flat-spotting the tires. However, during the time from when the brake pressure 311 is disconnected from the brake cylinder 316 to the time when the three-way valve 314 is deactivated, thereby reapplying brake pressure 311 to the brake cylinder 316, little trailer braking is being provided by the respective released wheel. Thus, embodiments of the invention maintain a level of braking when the wheel speed drops below the selected brake-release threshold value and, according to some embodiments, maintain a wheel speed less than the vehicle speed, but greater than zero.

Additionally, where hydraulic fluid is removed from the brake cylinder 316 during an ABS-release sequence, and when the three-way valve 314 returns to its normal position, illustrated in FIG. 3A, the pump 326 must supply a sufficient volume of hydraulic fluid to the brake cylinder 316 to restore brake pressure 311 at the respective wheel. During this brake-cylinder 316 fill time, the supply pressure 311 to all other wheels also will tend to drop and, therefore supply pressure 311 can be reduced to all other wheels even if they are not at the ABS-release threshold. To facilitate minimizing the reduction of supply pressure 311 embodiments of the invention include the modulating valve 312 in the return line to the hydraulic fluid reservoir 324. Any number of various enhancements of basic control algorithms can be used to control the position of the modulating valve 312. For example, in an embodiment described in more detail below with reference to FIGS. 8 and 9, the modulating valve 312 is controlled using baseline proportional control algorithm.

To ensure accurate diagnostics and appropriate braking control, the ABS braking system in the trailer can be calibrated with the systems in the tow vehicle. To determine the speed of a trailer wheel, a wheel-speed sensor is used to monitor a tone ring having reference points that, when detected by the sensor, result in an electronic pulse sent from the sensor to an ABS controller or other ECU. The ABS Controller has outputs to actuate the desired number of three-way valves, as well as their associated modulating valves and wheel sensors.

The ABS Controller monitors the period of time between the tone ring pulses to determine the wheel speed of the monitored wheel. During normal operation, when the brakes are not being applied, the ABS Controller receives a communication containing a current vehicle speed. In some embodiments, the ABS Controller receives the current vehicle speed directly from an available vehicle network. In other embodiments, a TIC acquires the current vehicle speed and provides the current vehicle speed to the ABS controller over a network such as, for example, a modified blue wire network, a CAN, or the like.

Because not all tires are the same size, not all tone rings are constructed the same, and because a number of normal inaccuracies tend to arise in measuring wheel speed, calibration of the trailer ABS controller can be synchronized with the tow vehicle's network and/or braking system. In embodiments, this calibration may be automatic based upon various recalibration criteria. In other embodiments, the calibration could be manually initiated and/or performed by the vehicle operator. To verify all trailer wheels are consistent and that all trailer tire pressures are sufficiently close to perform a system calibration, once up to speed, the pulse widths from all the supported wheel sensors are compared to one another and if the pulse widths are sufficiently close to one another, the respective wheels shall be used in the automatic calibration of the system. In embodiments, differences between wheel speeds on the trailer will result in a fault indication to the vehicle operator, sent from the ABS Controller to the command module via the supported interconnecting networks.

Figure 4:
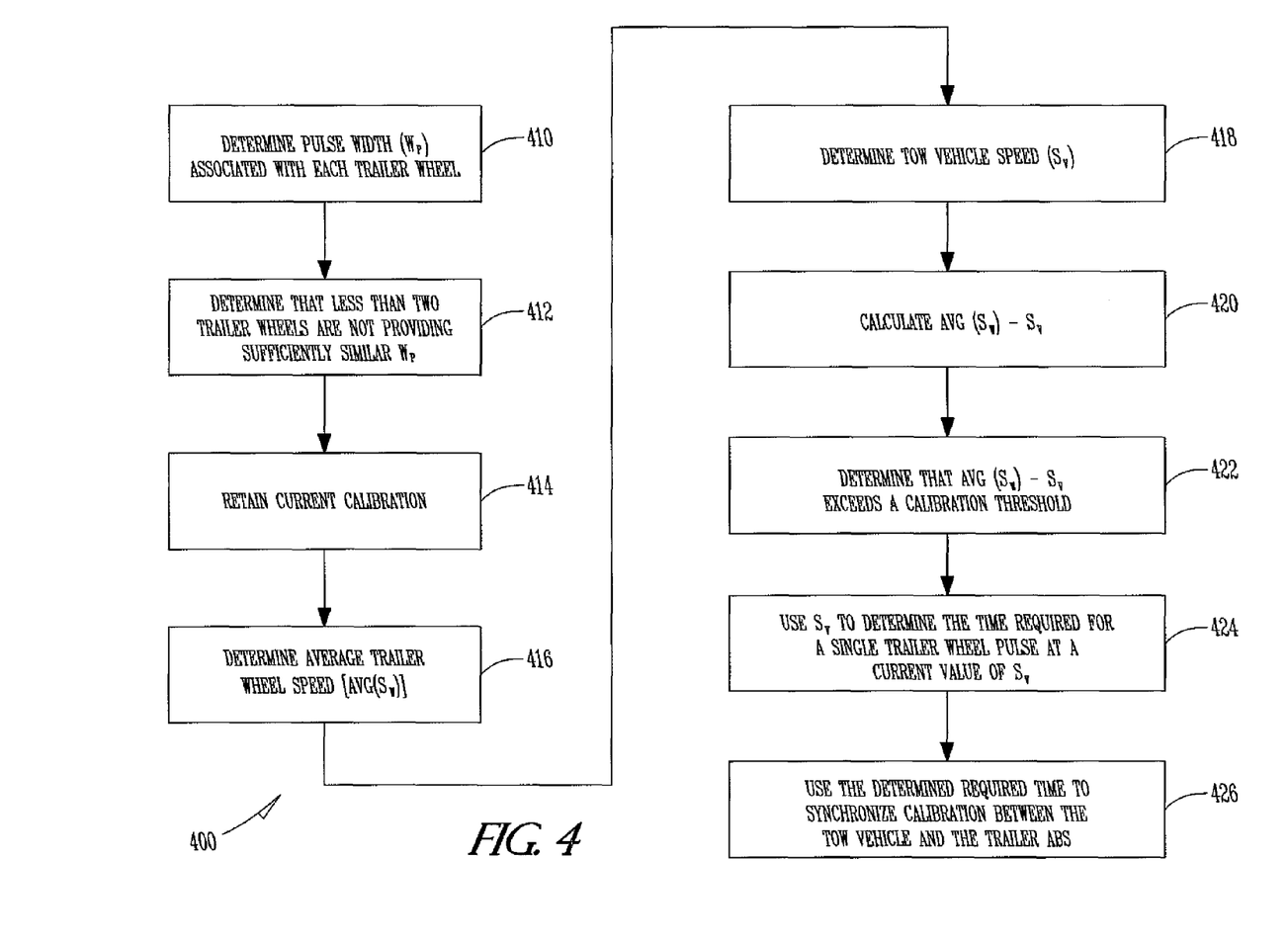
FIG. 4 is a flow diagram that depicts an illustrative method for facilitating controlled braking of a trailer coupled to a tow vehicle in accordance with embodiments of the invention.

Turning now to FIG. 4, a flow diagram depicts an illustrative method 400 for calibrating an ABS controller in accordance with embodiments of the invention. At a first illustrative step, step 410, a pulse width ($W_P$) associated with each trailer wheel is determined. In embodiments, the ABS controller determines each pulse width by processing data received from a wheel sensor associated with each trailer wheel. At step 412, the ABS controller determines that less than two trailer wheels are not providing sufficiently similar pulse widths ($W_P$s). In response to the determination of step 412, the current calibration is retained, as shown at step 414.

At step 416, the ABS controller determines an average trailer wheel speed ($AVG(S_W)$) by calculating the average speed of each trailer wheel. The current speed of the tow vehicle ("current vehicle speed") ($S_V$) is also determined, as shown at step 418. In embodiments, the current vehicle speed is determined by a component in the tow vehicle and can be provided to the ABS controller over a network. In some embodiments, the current vehicle speed can be determined by monitoring the speed of rotation of the tow vehicle's axle, the speed of rotation of the tow vehicle's wheels, the activity of the tow vehicle's transmission, or the like.

AT step 420, the ABS controller calculates a speed difference ($AVG(S_W)-S_V$) by computing the difference between the average trailer wheel speed and the current vehicle speed. As illustrated at step 422 in FIG. 5, the ABS controller determines that the speed difference exceeds a predetermined calibration threshold and, in response to this determination, uses the current vehicle speed to determine the amount of time required for a single trailer wheel pulse, as detected by an associated wheel sensor, corresponding to the current vehicle speed. At a final illustrative step, step 424, the ABS controller uses the time required for a single pulse, as determined in step 422, to synchronize calibration between the tow vehicle and the trailer ABS controller.

Figure 5:
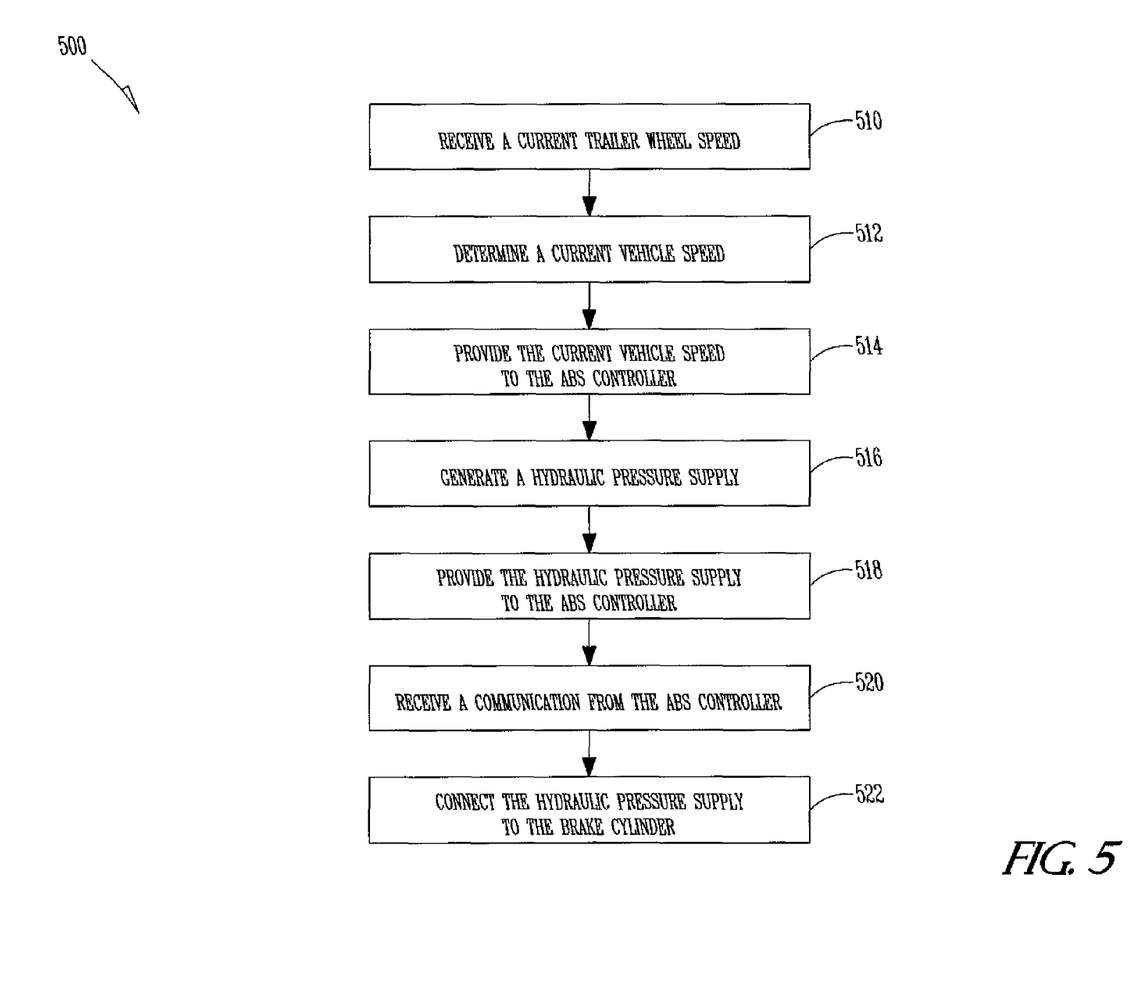
FIG. 5 is a flow diagram that depicts an illustrative method for calibrating an ABS controller in accordance with embodiments of the invention.

After calibrating the braking systems of the trailer and tow vehicle, aspects of embodiments of the invention can be used to facilitate controlled braking of the trailer. Turning now to FIG. 5, a flow diagram depicts an illustrative method for facilitating controlled braking of a trailer coupled to a tow vehicle. At a first illustrative step, step 510, the braking system receives a current trailer wheel speed from a wheel-speed sensor associated with the wheel. In embodiments, for example, an ABS controller disposed in the trailer receives data from the wheel-speed sensor and interprets the data to determine a current trailer wheel speed.

At step 512, a current speed of the tow vehicle ("current vehicle speed") is determined and, as illustrated at step 514, is provided to the ABS controller. According to various embodiments of the invention, the current vehicle speed can be received by a trailer in-cab controller (TIC) via a tow vehicle network. In some embodiments, for example, the tow vehicle network can include components that monitor tow vehicle speed. Tow vehicle speed can be ascertained in any number of ways such as, for example, monitoring rotation of the tow vehicle's wheels, monitoring the operation of the tow vehicle's transmission, and the like. The ABS controller can use the tow vehicle speed and the trailer wheel speed to determine an appropriate braking level, which is communicated to a trailer actuator controller (TAC).

An actuator generates a hydraulic pressure supply and provides the hydraulic pressure supply to the ABS controller, as indicated at steps 516 and 518, respectively. At step 520, a communication is received from the ABS controller, in response to which the hydraulic pressure supply is connected to the brake cylinder, as indicated at a final illustrative step, step 522. According to various embodiments of the invention, the hydraulic pressure supply is connected to the brake cylinder by operation of a three-way valve disposed between the hydraulic pressure supply and the brake cylinder. When the ABS is activated, the brake cylinder is connected to the brake fluid reservoir in the actuator via a modulating valve that can be used to adjust the braking level.

Figure 6:
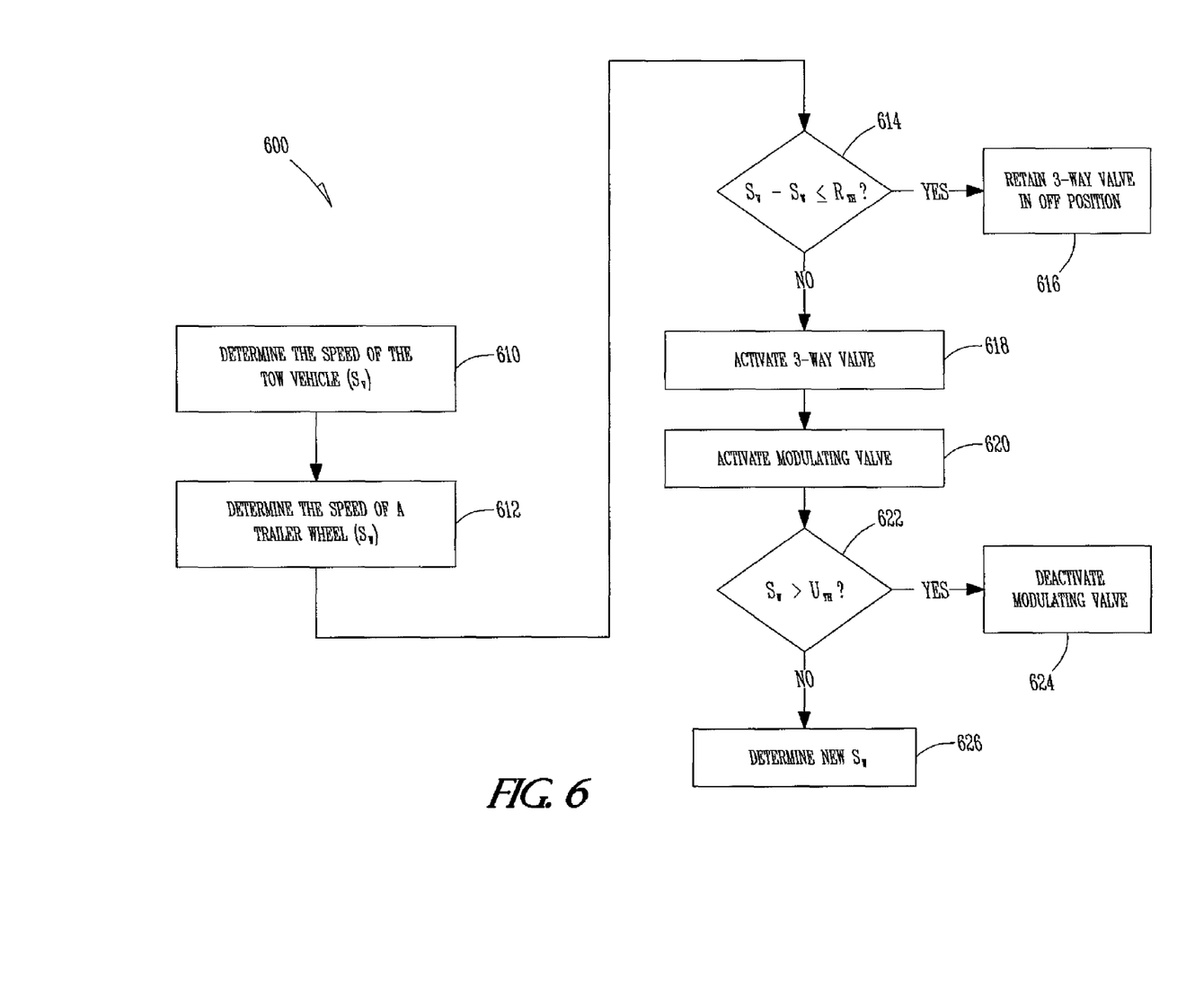
FIG. 6 is a flow diagram that depicts an illustrative method of facilitating controlled braking of a trailer coupled with a tow vehicle in accordance with embodiments of the invention.

Turning to FIG. 6, a flow diagram depicts an illustrative method 600 of facilitating controlled braking of a trailer coupled with a tow vehicle in accordance with embodiments of the invention. At a first illustrative step, step 610, the current speed ($S_V$) of the tow vehicle ("current vehicle speed") is determined. In embodiments, for example, a TIC receives the current vehicle speed from a tow vehicle network and provides the current vehicle speed to an ABS controller. In other embodiments, the ABS controller receives the current vehicle speed from the tow vehicle network.

At step 612, the ABS controller determines the current speed ($S_W$) of a trailer wheel. As discussed above, in embodiments of the invention, the current speed of a trailer wheel is determined by interpreting data from a wheel-speed sensor as it detects rotation of a tone ring associated with the wheel. For example, in an embodiment, the ABS controller receives information from each of a number of wheel sensors associated with trailer wheels and interprets the information to determine trailer wheel speeds corresponding to the trailer wheels.

At step 614, the ABS controller compares the current vehicle speed and the current wheel speed and, if the difference between the current vehicle speed and the current wheel speed (i.e., the speed difference ($S_V-S_W$)) does not exceed a brake-release threshold value ($R_{TH}$), the three-way valve is maintained in an off (deactivated) position, as indicated at step 616. If, however, the speed difference exceeds the brake-release threshold value, the three-way valve is activated, as indicated at step 618.

At step 620, the modulating valve is activated and adjusted. According to various embodiments, the modulating valve can be adjusted based on values of variable conditions, user preferences, current vehicle speed, current trailer wheel speed, and the like. In embodiments in which the trailer includes a number of independently-braked wheels, a modulating valve associated with each wheel is adjusted to facilitate independent control of the braking of each trailer wheel. As indicated at step 622, if the current wheel speed exceeds an up-to-speed threshold value ($U_{TH}$), the modulating valve is deactivated. If the current wheel speed does not exceed the up-to-speed threshold value, the modulating valve remains on and, as indicated at step 626, a new current wheel speed is determined, and the process repeats until the modulating valve is deactivated.

Figure 7:
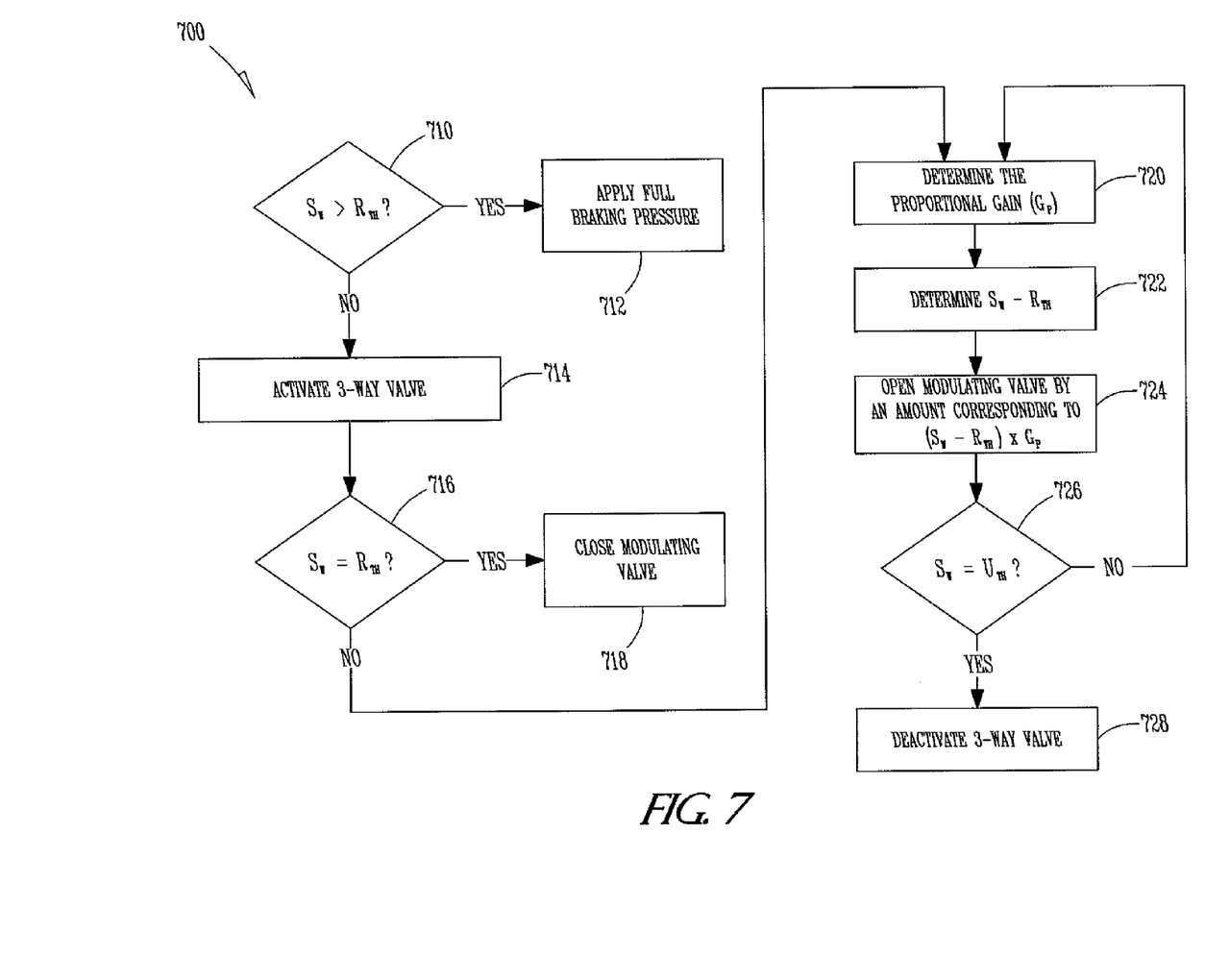
FIG. 7 is a flow diagram that depicts an illustrative method of adjusting a brake level associated with a trailer wheel in accordance with embodiments of the invention.

Turning now to FIG. 7, another flow diagram illustrates an illustrative method of facilitating a controlled braking of a trailer coupled to a tow vehicle in accordance with embodiments of the invention. At a first illustrative step, step 710, the current trailer wheel speed ($S_w$) of a trailer wheel is compared with a selected brake-release threshold ($R_{TH}$). In embodiments, for example, the brake-release threshold can be selected from a brake-release threshold table that is stored in memory associated with an ABS controller. In some embodiments, the memory can include a number of such tables, from which the ABS controller can select based upon values corresponding to variable conditions, selected brake-aggressiveness levels, and the like.

At step 712, the ABS controller causes the brakes to apply full braking pressure so long as the current trailer wheel speed is greater than the selected brake-release threshold. When the current trailer wheel speed drops below the selected brake-release threshold, a three-way valve is activated, as indicated at step 714. As shown at step 716, if the current wheel speed is equal to the selected brake-release threshold, a modulating valve associated with the wheel is closed, as indicated at step 718. The amount that the modulating valve is open, if the current wheel speed is not equal to the selected brake-release threshold, is set by the ABS controller.

For instance, as indicated at step 720, the ABS controller determines a proportional gain ($G_P$) associated with the modulating valve. In some embodiments, the ABS controller receives data from sensors that are interpreted to indicate the current proportional gain associated with the modulating valve. In other embodiments, the ABS controller determines a target proportional gain based on a number of factors. As shown at step 722, the ABS controller determines a speed difference, which is the difference between the current trailer wheel speed and the selected brake-release threshold. As shown at step 724, the modulating valve is opened by an amount corresponding to the product of the proportional gain and the speed difference determined in step 722.

As indicated at step 726 of FIG. 7, the current trailer wheel speed is monitored and compared to an up-to-speed threshold ($U_{TH}$). So long as the current trailer wheel speed is not equal to the up-to-speed threshold, the cycle of determining a proportional gain, and using the proportional gain to determine the amount to open the modulating valve repeats. When the current trailer wheel speed reaches the up-to-speed threshold, the three-way valve is deactivated, as indicated at step 728.

Figure 8:
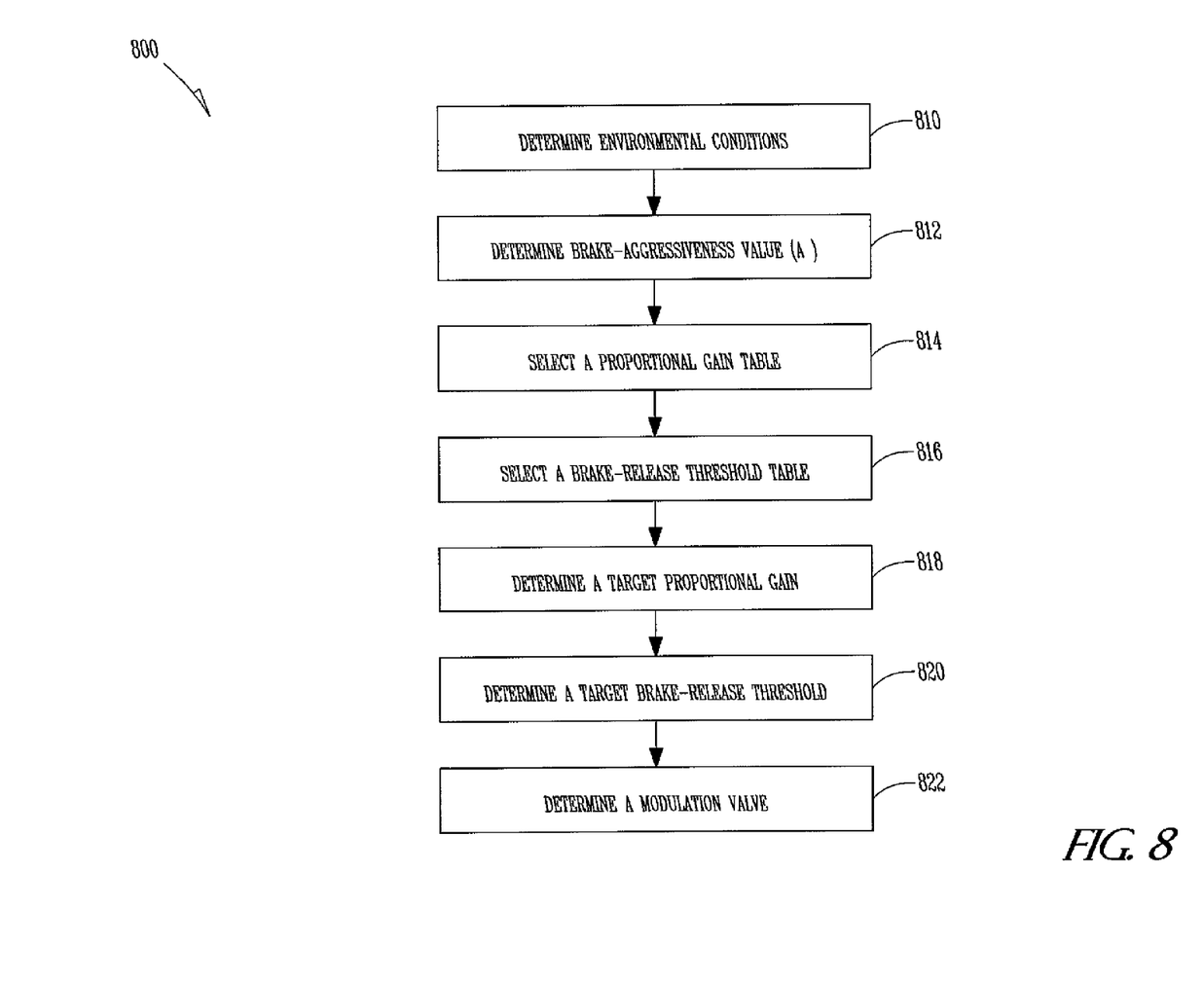
FIG. 8 is a flow diagram that depicts an illustrative method of determining a modulation value for controlling a modulating valve that facilitates a controlled braking of a trailer coupled to a tow vehicle in accordance with embodiments of the invention.

Turning now to FIG. 8, another flow diagram depicts an illustrative method of determining a modulation value for controlling a modulating valve that facilitates a controlled braking of a trailer coupled to a tow vehicle in accordance with embodiments of the invention. At a first illustrative step, step 810, environmental conditions are determined. As the term is used herein, "environmental conditions" includes any conditions (fixed or variable) that may have some relevance to the ABS braking process and fine-tuning. That is, for example, "environmental conditions" can include weather conditions, driving conditions, trailer conditions, vehicle conditions, and the like. At step 812, a brake-aggressiveness value is determined. In some embodiments, the operator of the tow vehicle can manually input the brake-aggressiveness value. In other embodiments, the brake-aggressiveness value is determined by a component of the braking system such as, for example, the TIC or ABS controller. In further embodiments, the braking system provides an option for the operator to manually enter the brake-aggressiveness value or to allow the braking system to select the value.

At step 814, a proportional-gain table is selected from a number of proportional-gain tables stored in memory associated with the ABS controller. Similarly, at step 816, a brake-release threshold table is selected from a number of brake-release threshold tables stored in memory associated with the ABS controller. At step 818, a target proportional gain is selected from the selected proportional-gain table and, as shown at step 820, the ABS controller determines a target brake-release threshold from the brake-release threshold table. At a final illustrative step, step 822, the ABS controller determines a modulation value based on the target proportional-gain value and the target brake-release threshold value.

Figure 9:
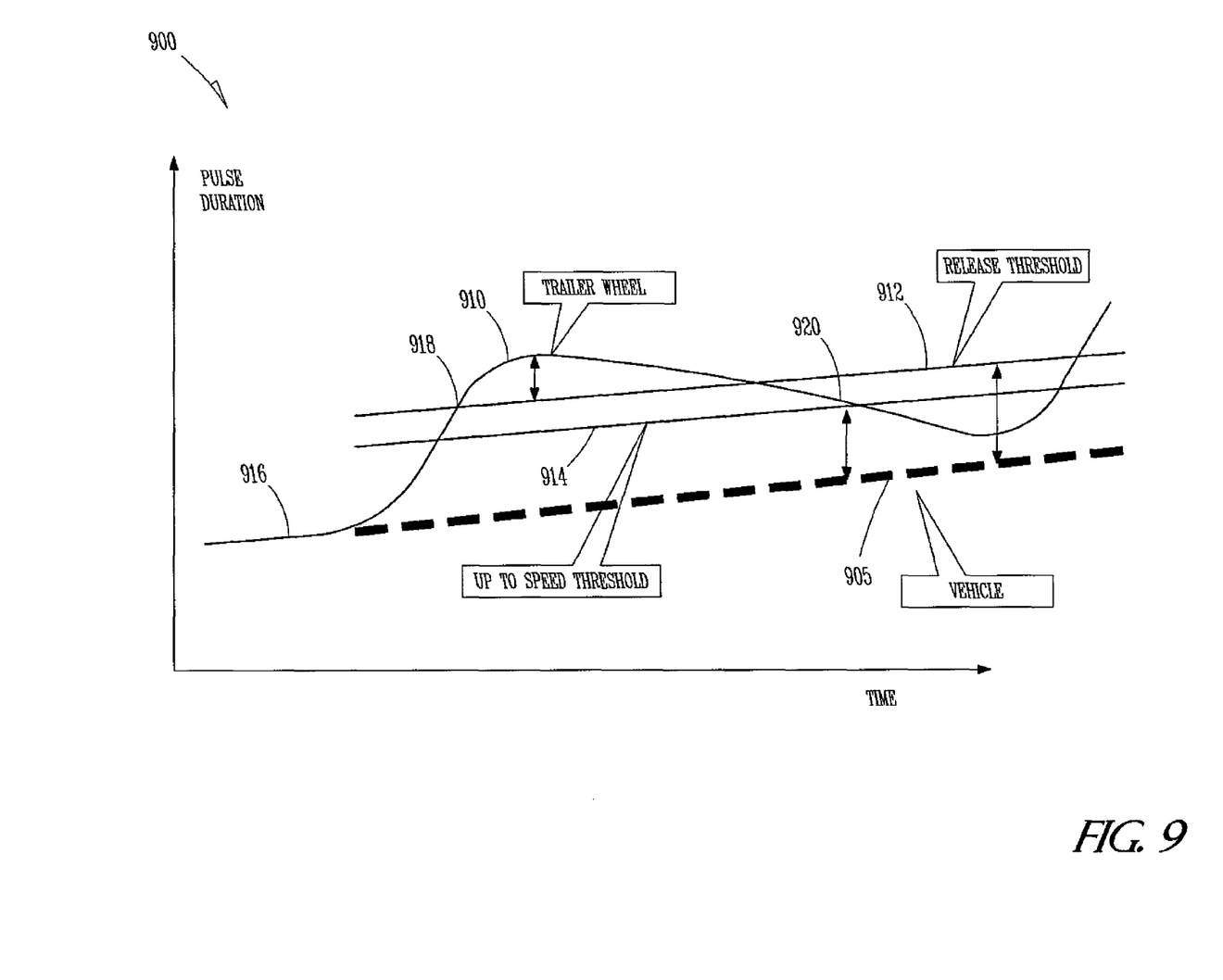
FIG. 9 is a graphical representation of an illustrative result of operation of embodiments of the invention.

Turning now to FIG. 9, a graphical representation 900 of an illustrative result of operation of embodiments of the invention is presented to illustrate the operation of those embodiments. In FIG. 9, as the brake pedal is being pushed, the decreasing vehicle pulse duration 905 is indicated by a dashed line, the trailer wheel pulse duration 910 is shown as a solid line, the brake-release threshold value 912 is shown as the dashed line furthest away from the vehicle pulse duration 905, and the up-to-speed threshold value 914 is shown as the dashed line closer to the vehicle pulse duration value 905. Although in FIG. 9 the dashed line 905 is labeled "Vehicle", the tow vehicle's wheel pulse duration may not be known to the ABS controller whereas in FIG. 9 the vehicle duration trace can be considered the pulse duration if the trailer wheel had no brake pressure being applied where those skilled in the art can derive this value from the vehicle velocity available from the tow vehicle via the network.

In FIG. 9, prior to the trailer wheel skidding, as indicated by reference 916, the wheel pulse duration 910 is exactly the same as the vehicle pulse duration 905. When the trailer wheel pulse duration 910 rises above the vehicle pulse duration 905, this indicates that the wheel is skidding. Prior to the wheel pulse duration 910 reaching the release threshold 912, full requested brake pressure is being applied to the brake cylinder. At the point 918 where the wheel pulse duration 910 gets slower than the release threshold 912, the three-way valve is activated. Since it takes a period of time for the valve to actually move and disconnect the supply pressure from the brake cylinder, the wheel speed 910 continues to decrease. Once the three-way valve shifts, the brake cylinder is connected to the hydraulic fluid reservoir through the modulating valve.

If the modulating valve was completely open, the trailer wheel pulse duration 910 would again begin increasing towards the vehicle pulse duration 905. Any number of various algorithms can be utilized in implementations of the invention. In one embodiment, for example, the basic operation utilizes an inverted proportional control algorithm, where the modulating valve is fully closed when the wheel pulse duration 910 equals the release threshold 912, and where the modulating valve opens as the difference between the wheel pulse duration 910 and the release threshold 912 increases. The amount the modulating valve will open is equal to the proportional gain times the difference between the wheel pulse duration 910 and the release threshold 912. That is, higher proportional-gain values will cause the modulating valve to open faster, thereby causing the wheel to accelerate sooner.

Once sufficient brake fluid is released from the brake cylinder, and the trailer wheel pulse duration 910 begins to decrease, the difference between the trailer wheel pulse duration 910 and the release threshold 912 decreases, thereby causing the modulating valve to start closing. Upon accelerating back to the release threshold 912, the modulating valve would be completely closed. However, due to response time of the valves and hydraulic leakage, the trailer wheel pulse duration 910 will continue to decrease until the point 920 where it reaches the up-to-speed threshold value 914, at which time the three-way valve is deactivated. Since it takes a period of time for the three-way valve to actually return to its off position, the trailer wheel pulse duration 910 continues to decrease towards the vehicle pulse duration 905 and, depending upon the traction conditions and the available supply pressure, will potentially return to the vehicle pulse duration 905.

It will be appreciated by those having skill in relevant arts that the release threshold 912 impacts the level of deceleration force achieved before the supply pressure is disconnected from the brake cylinder. Additionally, the proportional gain impacts the rate at which the modulating valve opens once the three-way valve is shifted. Moreover, both the proportional-gain value and the brake-release threshold value may require different settings based upon the weight of trailer, current traction conditions and the like. Accordingly, various embodiments of the invention facilitate varying these values throughout the vehicle speed 905 range. Some embodiments of the invention allow for utilization of different sets of values for different driving conditions and the desires of the vehicle operator.

The present invention has been described in relation to particular embodiments, which are intended in all respects to be illustrative rather than restrictive. Alternative embodiments will become apparent to those of ordinary skill in the art to which the present invention pertains without departing from its scope. For example, in some embodiments, the TIC is configured such that a telephone extension cable (or any other type of communication extension cable) can be used to extend the reach of a command module such that the operator can bleed the brakes without requiring the assistance of a second operator. Additionally, in embodiments, multiple trailers can be connected to a tow vehicle and the TIC can automatically guide calibration with respect to the tow vehicle and both of the trailers so that ABS brakes on all three vehicles are controllable through a single networked system.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. An antilock braking system (ABS) that facilitates controlled braking of a trailer coupled to a tow vehicle, the system comprising:
    an ABS controller that receives a current wheel speed associated with a trailer wheel and adjusts a brake level associated with the wheel, wherein the current wheel speed is received from a wheel-speed sensor;
    a trailer in-cab controller (TIC) that determines a current speed of the tow vehicle ("current vehicle speed") using an On Board Diagnostic (OBD) connector and provides the current vehicle speed to the ABS controller;
    an actuator controller (TAC) that controls an electric-hydraulic trailer actuator ("actuator"), wherein the actuator generates a hydraulic pressure supply and provides the hydraulic pressure supply to the ABS controller;
    a brake cylinder associated with the wheel, wherein the brake cylinder facilitates applying a braking force to the wheel;
    a valve means that operates to connect the hydraulic pressure supply to the brake cylinder or disconnect the hydraulic brake supply from the brake cylinder, in response to receiving a communication from the ABS controller; and
    said ABS controller calculates a speed difference between the current trailer wheel speed and the current vehicle speed and uses the calculated speed difference to determine whether to send the communication to the valve means.

2. The system of claim 1, wherein the ABS controller compares the speed difference to a brake-release threshold, the brake-release threshold being stored in memory associated with the ABS controller.

3. The system of claim 2, wherein, if the speed difference exceeds the brake-release threshold, the communication from the ABS controller causes the valve means to disconnect the hydraulic brake supply from the brake cylinder.

4. A method for facilitating controlled braking of a trailer coupled to a tow vehicle, wherein the trailer includes a trailer antilock brake system (ABS) having an ABS controller, the method comprising:
    receiving, at the ABS controller, a current wheel speed associated with a trailer wheel, wherein the current wheel speed is received from a wheel-speed sensor;
    determining a current speed of the tow vehicle ("current vehicle speed");
    providing the current vehicle speed to the ABS controller;
    generating, at an electric-hydraulic trailer actuator ("actuator"), a hydraulic pressure supply;
    providing the hydraulic pressure supply to the ABS controller;
    connecting, by adjusting a position of a valve means, the hydraulic pressure supply to a brake cylinder associated with the wheel, in response to receiving a communication from the ABS controller;
    adjusting a brake level associated with the wheel, wherein adjusting the brake level includes adjusting a position of a modulating valve;
    said valve means is disposed between the modulating valve and the brake cylinder; and
    adjusting the position of the modulating valve includes receiving an electrical pulse width modulated (PWM) output from the ABS controller, wherein the position of the modulating valve is adjusted by varying a duty cycle of the PWM output; and selecting a brake-release threshold; and calculating a release difference, wherein the release difference is the difference between the current wheel speed and the selected brake-release threshold.

5. The method of claim 4, further comprising:
    selecting a proportional-gain value; and
    multiplying the proportional-gain value by the release difference to determine a modulation value.

6. The method of claim 5, further comprising applying the modulation value to the PWM output.

7. The method of claim 6, wherein selecting said proportional-gain value includes referencing a plurality of proportional-gain values, wherein the plurality of proportional-gain values is stored in a first proportional-gain table.

8. The method of claim 7, wherein the first proportional-gain table contains a proportional-gain value corresponding to each of a plurality of values associated with a variable.

9. A braking system for a trailer that is coupled to a tow vehicle, wherein the braking system facilitates controlled braking of the trailer, the system comprising:
    a trailer antilock brake system (ABS), the ABS comprising an ABS controller that receives a current wheel speed associated with a trailer wheel and adjusts a brake level associated with the wheel, wherein the current wheel speed is received from a wheel-speed sensor;
    a trailer in-cab controller (TIC) that determines a current speed of the tow vehicle ("current vehicle speed") and provides the current vehicle speed to the ABS controller, wherein the TIC determines the current vehicle speed using an On Board Diagnostic (OBD) connector;

a trailer actuator module housing a trailer actuator controller (TAC) and an electric-hydraulic trailer actuator ("actuator"), wherein the TAC controls the actuator, and wherein the actuator generates a hydraulic pressure supply and provides the hydraulic pressure supply to the ABS controller;

a brake cylinder associated with the wheel, wherein the brake cylinder facilitates applying a braking force to the wheel; and a valve means that disconnects the hydraulic pressure supply from the brake cylinder, in response to receiving a communication from the ABS controller, wherein the ABS controller calculates a speed difference between the current trailer wheel speed and the current vehicle speed, selects a brake-release threshold value from a plurality of brake-release threshold values stored in an associated memory, determines that the speed difference exceeds the selected brake-release threshold value, and sends the communication in response to determining that the speed difference exceeds the selected brake-release threshold value.

\* \* \* \* \*